United States Patent
Funda et al.

(10) Patent No.: US 6,226,566 B1
(45) Date of Patent: *May 1, 2001

(54) METHOD OF CONSTRAINED CARTESIAN CONTROL OF ROBOTIC MECHANISMS WITH ACTIVE AND PASSIVE JOINTS

(75) Inventors: Janez Funda, Valhalla; Russell Highsmith Taylor, Ossining, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/251,932

(22) Filed: Feb. 18, 1999

Related U.S. Application Data

(63) Continuation of application No. 08/896,218, filed on Jul. 17, 1997, now Pat. No. 5,887,121, which is a continuation of application No. 08/427,293, filed on Apr. 21, 1995.

(51) Int. Cl.[7] .............................. G05B 15/00; G05B 19/00
(52) U.S. Cl. ......................... 700/263; 700/245; 700/246; 700/260; 700/264; 703/1; 703/6; 703/7; 901/34; 901/45; 901/47; 901/48
(58) Field of Search ................................... 700/245, 263, 700/260, 246, 264, 45; 703/1, 7, 6; 600/204, 595; 901/34, 45, 47, 9, 15, 10, 41, 48

(56) References Cited

U.S. PATENT DOCUMENTS

| | | | |
|---|---|---|---|
| 4,826,392 | * | 5/1989 | Hayati ................................ 700/260 |
| 5,294,873 | * | 3/1994 | Seraji ................................. 318/568.1 |
| 5,297,057 | * | 3/1994 | Kramer et al. ............................ 703/7 |
| 5,377,310 | * | 12/1994 | Jan et al. ............................... 700/260 |
| 5,397,323 | * | 3/1995 | Taylor et al. .......................... 606/130 |
| 5,402,801 | * | 4/1995 | Taylor ................................. 128/898 |
| 5,887,121 | * | 3/1999 | Funda et al. ........................... 700/263 |

OTHER PUBLICATIONS

John J. Craig, Introduction to Robotics Mechanics & Control, A. Wesley, pp. 144–147, 1955.*

Shin* et al., Adaptive Robust Control of Underactuated Robot Manipulators, IEEE., p. 95, 1997.*

* cited by examiner

Primary Examiner—William A. Cuchlinski, Jr.
Assistant Examiner—McDieunel Marc
(74) Attorney, Agent, or Firm—McGuireWoods, LLP; Louis J. Percello, Esq.

(57) ABSTRACT

The present invention is a method of controlling a robotic mechanism comprising both active and passive joints, where the motion of one or more of the passive joints is constrained by one or more constraints imposed on the mechanism by the environment, the mechanical construction of the mechanism or the nature of the task. The method is capable of controlling mechanisms with multiple sets of passive joints with multiple environmental constraints restricting the motion of the mechanism. In a preferred embodiment the novel method is used to control a surgical robot holding a surgical instrument inserted into a patient through a natural or man-made orifice.

1 Claim, 11 Drawing Sheets

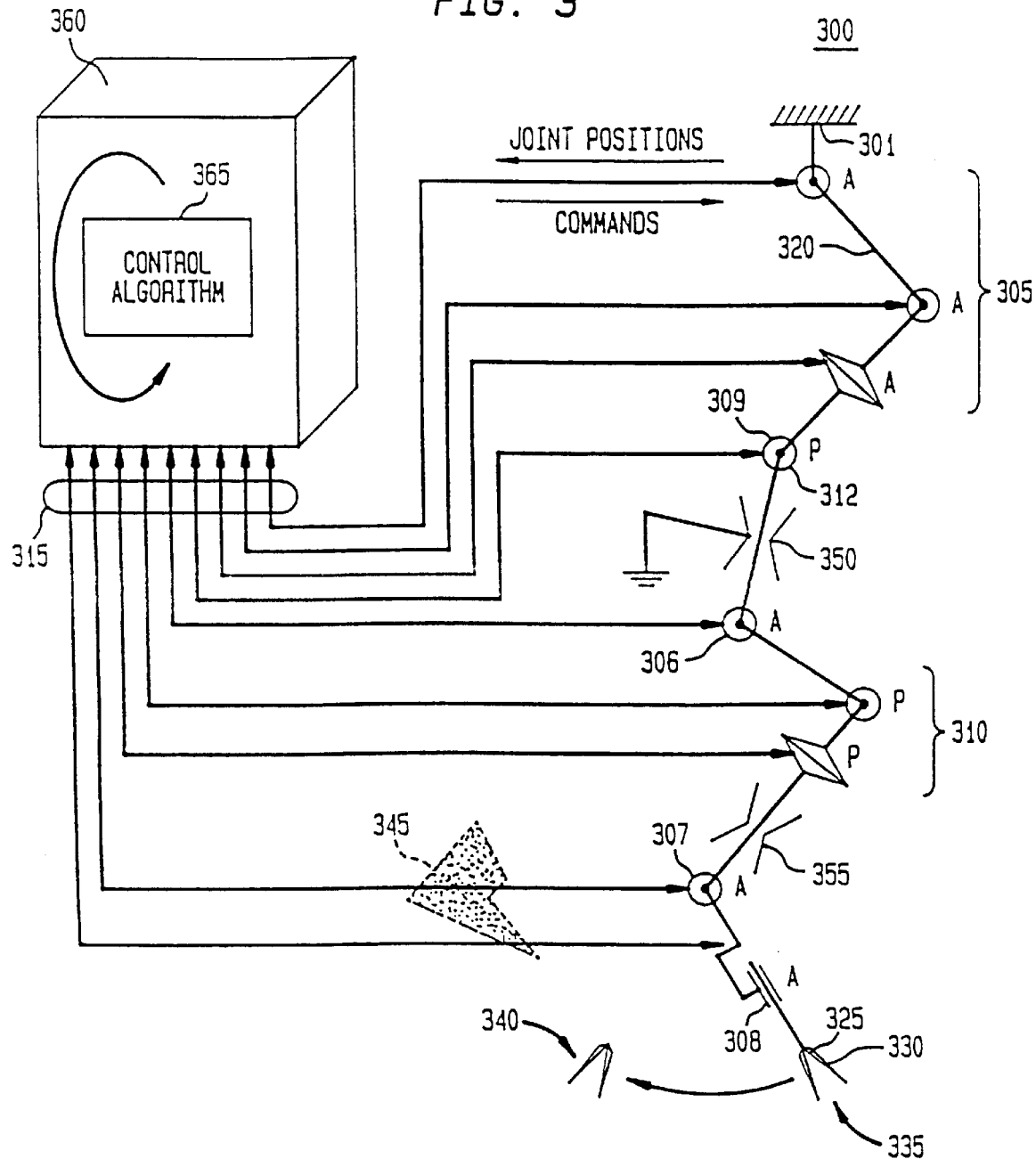

e RESTRICTED TO: 3 ROTATIONS ABOUT o
1 TRANSLATION ALONG a e RESTRICTED TO: 3 ROTATIONS ABOUT o e RESTRICTED TO: 1 TRANSLATION ALONG a

US 6,226,566 B1

METHOD OF CONSTRAINED CARTESIAN CONTROL OF ROBOTIC MECHANISMS WITH ACTIVE AND PASSIVE JOINTS

CROSS REFERENCE TO RELATED APPLICATIONS

This application is a continuation of application Ser. No. 08/896,218, filed Jul. 17, 1997, now U.S. Pat. No. 5,887,121, which is a continuation of application Ser. No. 08/427,293, filed Apr. 21, 1995.

FIELD OF THE INVENTION

This invention relates to the field of robotics. More specifically, the invention relates to controlling robotic mechanisms with both active and passive joints.

BACKGROUND OF THE INVENTION

Robotic mechanisms comprising only active joints are used widely in a number of application domains and the control of such mechanism is well understood. We will refer to such mechanisms as active mechanisms. Active mechanisms are particularly well suited for situations where the working volume of the mechanism is free of obstacles and environmental constraints on the motion of the mechanism. This is typically the case for applications of active robot mechanisms to manufacturing tasks, where the robot workcell is specifically designed to suit the requirements of the robot mechanism. There are situations, however, where access to the working volume of a robotic mechanism can not be made unimpeded. In such situations access to the working volume is restricted by environmental constraints, such as small openings, tight passages and obstacles. With active mechanisms these constraints must be accommodated with time-consuming off-line programming to allow the mechanism to accomplish a given task without undesired contact with the environment. The success of task execution depends on the accuracy with which the programmer has captured the geometry of the environmental constraints and the accuracy with which complex coordinated motions of multiple joints of the robot mechanism are carried out. This approach is inflexible and error-prone, often leading to unintended or overly forceful interaction between the robot mechanism and the environment, potentially damaging the environment, the mechanism itself, or both.

An alternative approach to controlling robotic mechanisms in the presence of environmental constraints is to use robot mechanisms which include one or more passive joints. We will refer to such robot mechanisms as hybrid mechanisms. By ensuring that each link of a hybrid mechanism, which is constrained by an environmental constraint, is attached to one or more passive joints at the proximal end of the constrained link, such a hybrid mechanism can comply freely with the environmental constraints acting on the mechanism. (Throughout this document we will use the terms 'proximal' and 'distal' to mean 'closer to' and 'further from' the base of the robot, respectively. The base of the robot refers to the point where the robot is rigidly attached to the environment.) This arrangement ensures that neither the environment nor the mechanism itself will be damaged during task execution, which makes hybrid mechanisms the preferred solution for applications where access to the workspace is restricted and avoiding incidental damage to the environment is critical. However the use of passive joints significantly complicates control of the mechanism and so hybrid mechanisms are rarely used in practice. The difficulties in controlling hybrid mechanisms arise because the environmental constraints on the motion of the constrained elements and attached passive joints must be characterized and used to accurately predict the motion of the mechanism in response to a given displacement of active joints. Further, the control is complicated by the fact that the location where a given environmental constraint is acting on the mechanism may change as the mechanism moves. This requires that the control method be able to update the characterization of the environmental constraints on the motion of the mechanism at run-time.

We will define a mechanism to comprise a serial chain of two or more rigid links, connected by one or more joints. Each of the joints can be either active or passive. An active joint is equipped with an actuator (motor), which is capable of moving the joint, and an encoding device (encoder), which provides information about the position of the joint at any time. A mechanism consisting of only active joints will be referred to as an active mechanism. A mechanism comprising both active and passive joints will be referred to as a hybrid mechanism. An element of the mechanism will refer to either a joint or a link of the mechanism. The element whose motion relative to the workspace is being controlled will be referred to as the target element. Normally the target element will correspond to a tool or an instrument attached to the distal end of the mechanism, but could be, in general, any element of the mechanism. We will use the term sub-mechanism to mean a subset of a larger mechanism, the sub-mechanism comprising at least one element of the larger mechanism. We will define the pose of an element to be the position and orientation of the element, expressed with respect to a given (e.g., Cartesian) coordinate frame. We will distinguish between a desired pose of an element and an actual pose of an element. The desired pose of an element is the pose that the element is expected to attain as a result of the control action of a control method. The desired pose of the target element is input to the control method. The actual pose of an element is the element's current pose with respect to a given Cartesian coordinate system. We will define a pose difference between pose A and pose B of an element to be a function of the two poses. Normally, the result of evaluating the pose difference function will be the Euclidean distance between the positional parts of the two poses and a unit vector and angle corresponding to the finite rotation separating the orientational components of the two poses. However, other functions can be defined to represent the pose difference between two given poses of an element.

FIGS. 1 and 2 introduce the notational conventions used throughout this document and provide a brief overview of the state of the art in control of active mechanisms. FIG. 1a shows a simple mechanism consisting of 4 links (101, 104, 107, 110), three mechanical joints (102, 105, 108), and three actuators corresponding to the three mechanical joints (103, 106, 109, respectively). Each of the actuators comprises a motor (111), which delivers mechanical force or torque to move the joint, and a means of determining the angular or linear position of the joint (112), which enables closed-loop control of each of the joints. FIGS. 1b, 1c, 1d, and 1e detail the notational conventions for the four types of mechanical joints that will be used in this document. FIG. 1b shows a translational joint (121) and the corresponding symbolic representation (122) used in subsequent figures. FIG. 1c shows a rotary twist joint (141) and the corresponding symbolic representation (142). FIG. 1d shows an out-of-plane revolute joint (161) and the corresponding symbolic representation (162). Finally, FIG. 1e shows an in-plane revolute joint (181) and the corresponding symbolic representation (182).

FIG. 2 shows a flow diagram of a typical control method for Cartesian control of a target element of a robotic mechanism comprising only active joints. The method 200 begins by determining the positions of all joints of the mechanism (205). The position of a translational joint is expressed as a linear distance and the position of a rotary joint is expressed as an angular displacement. Standard mathematical techniques (known in the art as forward kinematic) are then used to compute the actual (current) pose of the target element (210). The actual pose of the target element is compared with the desired pose of the target element (215) and the control method is terminated (220) if the difference between the two poses is less than some predetermined amount, where the amount can be a vector quantity. The pose difference consists of a positional and an orientational component. If the pose difference is larger than the predetermined amount, the method continues by characterizing the effect of moving each of the joints on the resulting Cartesian displacement of the target element (225). This step is accomplished by analyzing the effect of moving each individual joint of the mechanism on the Cartesian displacement of the target element. For each joint j this mapping will be, in general, a nonlinear function of the joint positions of all joints appearing in the serial chain of the mechanism between the joint j and the target element. The combined nonlinear mapping, which includes the individual mappings for each of the joints, is referred to in the art as the Jacobian mapping. In general, the Jacobian mapping relates infinitesimal displacements of each of the joints of a mechanism to the resulting Cartesian displacement of an element of the mechanism. The Jacobian mapping is a nonlinear function of the joint positions of all joints of the mechanism and therefore takes on different numerical values for different configurations (joint position values) of the mechanism.

Referring again to FIG. 2, in step (230) of method 200 the desired motion of the target element is next characterized and expressed as a six-vector of positional and orientational change relative to the actual (current) pose of the mechanism. The incremental motion for each joint is then computed, such that the difference between the resulting actual pose of the target element and the desired pose of the target element is minimized (235). For most industrial and service robot mechanisms this step normally involves a straightforward evaluation of known equations, known in the art as inverse kinematic equations. For more complicated mechanisms, which do not admit closed-form inverse kinematic equations (such as robot mechanisms comprising more than six joints) this step may involve a nonlinear optimization. A number of techniques for carrying out nonlinear optimization computations are known in the art. A given iteration of the control method ends by moving each of the joints of the mechanism (240) by the incremental motions computed in step (235) above. The method then resumes at step (205) and continues until the pose difference in step (215) becomes less than the predetermined amount and the method terminates.

Very few examples of controlling hybrid passive/active mechanisms have been reported in the published literature. The prior art includes two examples of hybrid passive/active mechanisms which are being controlled in the presence of a single environmental constraint. Both examples arise in the context of laparoscopic surgery, where the constrained element is a laparoscope and the environmental constraint is the port of entry of the laparoscope into the patient. Due to the environmental constraint imposed by the port of entry into the patient, the motion of the laparoscope is limited to four degrees of freedom (d.o.f.) of motion: three orthogonal rotations about the port of entry and one translation d.o.f. along the long axis of the instrument.

Hurteau et. al. describe a robotic system for laparoscopic surgery where a robotic arm is connected to a laparoscope via a two-axis passive universal joint at the wrist of the robot. They use a manual teach pendant to independently control the translational motion of the robot's wrist, relying on the compliant passive linkage to position the laparoscope tip in azimuth, elevation and insertion depth. Each of the translational d.o.f. of the robot wrist is controlled manually by adjusting the corresponding knob or dial on the teach pendant.

Wang et. al. also use a robotic arm and a passive universal joint to position a laparoscope inside the patient, subject to the constraint imposed by the port of entry of the laparoscope into the patient. They add a driven instrument rotation stage to allow control of azimuth, elevation, rotation and insertion depth of the laparoscope. The details of their control method have not been made public, but several limitations of the method are apparent from the observed behavior of the system (as discussed later).

A less directly related reference on the subject of control of hybrid passive/active mechanisms has been disclosed by Jain et. al. in U.S. Pat. No. 5,377,310. In this work a robot manipulator comprising both active and passive joints is being controlled by estimating passive joint friction forces on passive joints and using these estimates to predict the dynamic behavior of the passive joints during high-speed motion of the manipulator due to the motion of the active joints. Dynamic parameters of all links and all actuators comprising the mechanism are assumed known.

STATEMENT OF PROBLEMS WITH THE PRIOR ART

Hurteau et. al. present a very simple, manual control strategy for controlling the motion of a target element (laparoscope) attached to the end of a hybrid mechanism (industrial robot with an attached passive universal joint). The control method is specifically tailored to the task at hand and a control panel with three knobs is used to manually control each of the three d.o.f. of motion of the constrained element (laparoscope). Further, this strategy does not allow simultaneous coordinated control of all three d.o.f. of the constrained element and is only applicable to a single environmental constraint of the specific type presented by the port of entry of the laparoscope into the patient. Finally, the control strategy does not allow specification of additional constraints on the motion of the mechanism as dictated by the mechanism itself or the nature of the task.

The control strategy of Wang et. al. has not been disclosed. It appears that their strategy is also specifically tailored to the case of a single constraint of a specific type imposed by a laparoscope passing through an artificial orifice into the patient. They have disclosed no control method applicable to hybrid mechanisms comprising multiple sets of passive joints or to multiple environmental constraints, nor have they exhibited such a system demonstrating controlled behavior. Further, they have disclosed no method for specifying additional motion constraints to guarantee achievement of additional task goals or constraints. Finally, they have not demonstrated a system having the ability to trade off multiple task goals and constraints.

While the details of the control strategy employed by Wang et. al. are not known, it appears that their strategy is also specifically tailored to the case of a single constraint of the specific type imposed by a laparoscope passing through an artificial orifice into the patient. The methods therefore does not appear to be applicable to hybrid mechanisms comprising multiple sets of passive joints or multiple environmental constraints. It also does not seem to have any facility for specifying additional constraints dictated by the nature of the task.

Jain's approach to controlling hybrid mechanisms is quit different from the above approaches. Jain et. al. do not consider environmental constraints on the motion of the passive joints, but are instead concerned with controlling high-speed dynamic behavior of a hybrid mechanism. This control strategy is applicable only to situations when the robot mechanism is moving with substantial velocity; no static or low-speed control is possible with this approach.

None of the control methods reported in the prior art represent a general control framework for effectively and accurately controlling robotic mechanisms comprising both active and passive joints in the presence of environmental constraints. Specifically, these control methods do not effectively control mechanisms with multiple sets of passive joints (separated by one or more active joints) and where multiple environmental and task constraints are acting on the mechanism.

OBJECTS OF THE INVENTION

An object of this invention is an improved method for controlling robotic mechanisms with active and passive joints.

An object of this invention is an improved method for controlling robotic mechanisms with active and passive joints in the presence of constraints imposed by the environment or the nature of the task.

An object of this invention is an improved method for controlling robotic mechanisms with active and passive joints in the presence of constraints imposed by the environment or the nature of the task for use in robotic surgery.

SUMMARY OF THE INVENTION

The present invention is a method of controlling a robotic mechanism comprising both active and passive joints, where the motion of one or more of the passive joints is constrained by one or more environmental constraints imposed on the mechanism by the environment. The invention has applications in a variety of situations where robot mechanisms must be controlled in the presence of a restricted access to the working volume, but is particularly useful for control of robotic mechanisms comprising multiple sets of passive joints with multiple environmental constraints restricting the motion of the mechanism.

The method begins by determining the positions of one or more joints of the mechanism and using this information to determine the actual pose of a target element of the mechanism. A pose difference is found between the actual pose and a desired pose of the target element. On the first iteration of the method, a novel characterization of one or more environmental constraints on the motion of one or more of the passive joints of the mechanism is performed. This information, together with a characterization of any existing environmental constraints on the motion of active joints, and a characterization of the effects of the motion of each of the mechanism's active and passive joints on the motion of the target element, is used to determine an incremental motion of the active joints of the mechanism. The active joints are then moved through the determined incremental displacements, respectively, resulting in an incremental motion of the target element such that the pose difference between the desired and actual pose of the target element is minimized.

One novel feature of the present invention is the characterization of the effects of the existing environmental constraints on the motion of the passive joints of the mechanism and, indirectly, the motion of the target element. This characterization allows the novel method to determine an incremental active joint motion which will minimize the pose difference between the desired and actual pose of the target element while complying with the existing environmental constraints on the mechanism.

In another preferred embodiment, the novel control method allows specification of additional constraints on the motion of any part of the mechanism, where the additional constraints are dictated by the mechanical construction of the mechanism or the particular nature of the task.

In still another preferred embodiment, the novel control method is used to control the motions of a surgical robot during laparoscopy. In this embodiment, the surgical robot holds a laparoscope which is inserted into the abdominal cavity of a patient. The port of entry of the laparoscope into the patient constitutes an environmental constraint on the motion of the laparoscope, which is attached to the robot mechanism via a passive universal joint. The novel method described in the present invention is used to control the robot mechanism so as to allow the surgeon to position the laparoscope into any reachable configuration within the workspace of the mechanism.

BRIEF DESCRIPTION OF THE DRAWINGS

FIG. 1, comprising

FIG. 3 is a block diagram of a robot mechanism with both active and passive joints controlled by the present invention.

FIG. 4, comprising

DETAILED DESCRIPTION OF THE INVENTION

Figure 1A:
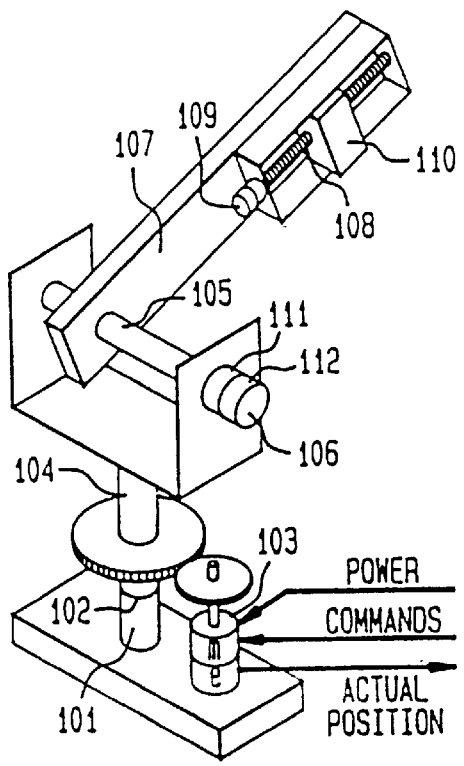
FIGS. 1a–1e, is a block diagram of an example prior art robotic mechanism (FIG. 1a) with symbolic representations for the various types of joints (FIGS. 1b–1e).
Figure 1B:
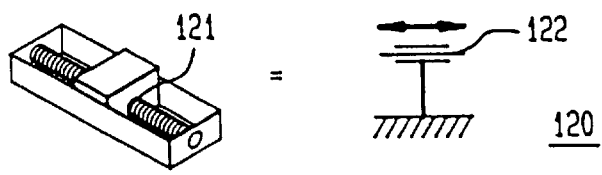
Figure 1C:
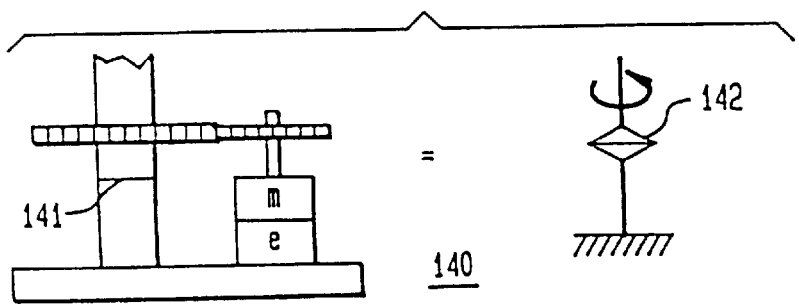
Figure 1D:
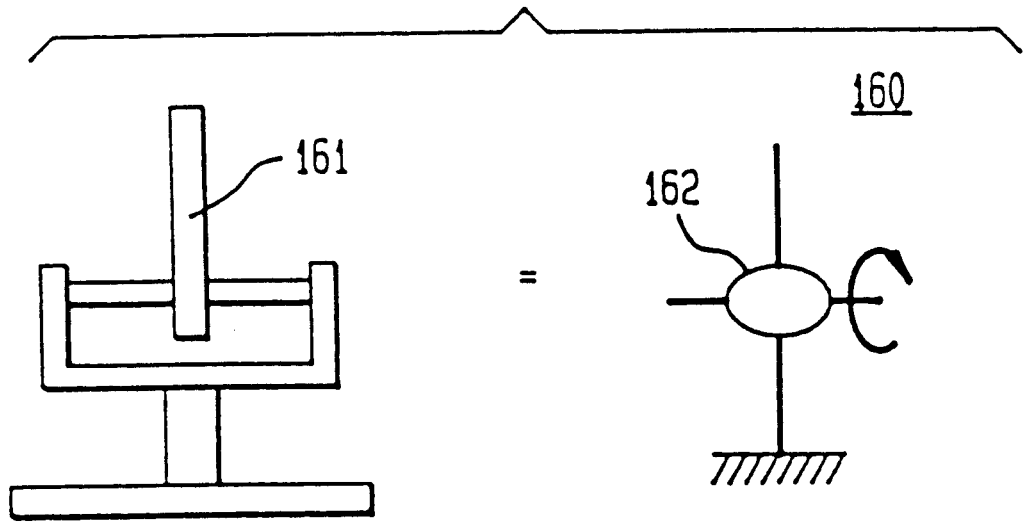
Figure 1E:
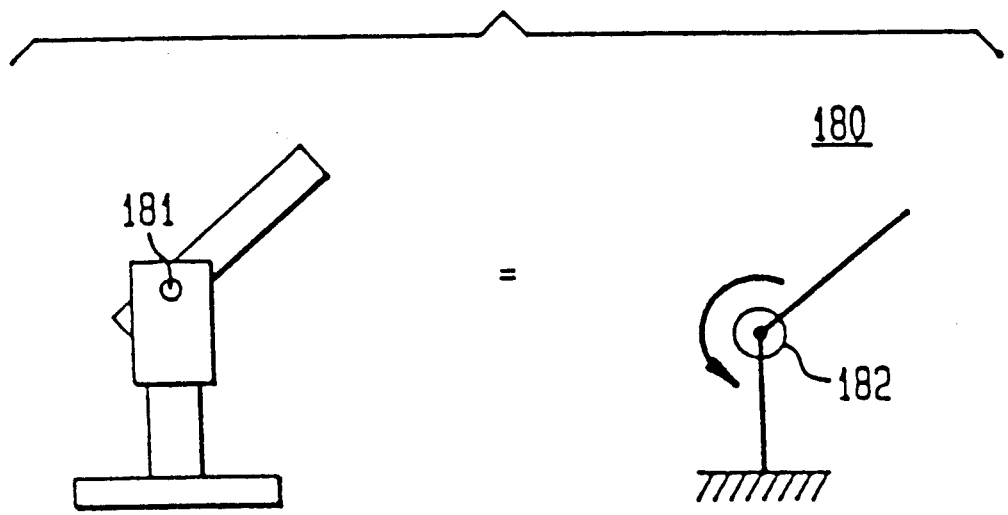
Figure 2:
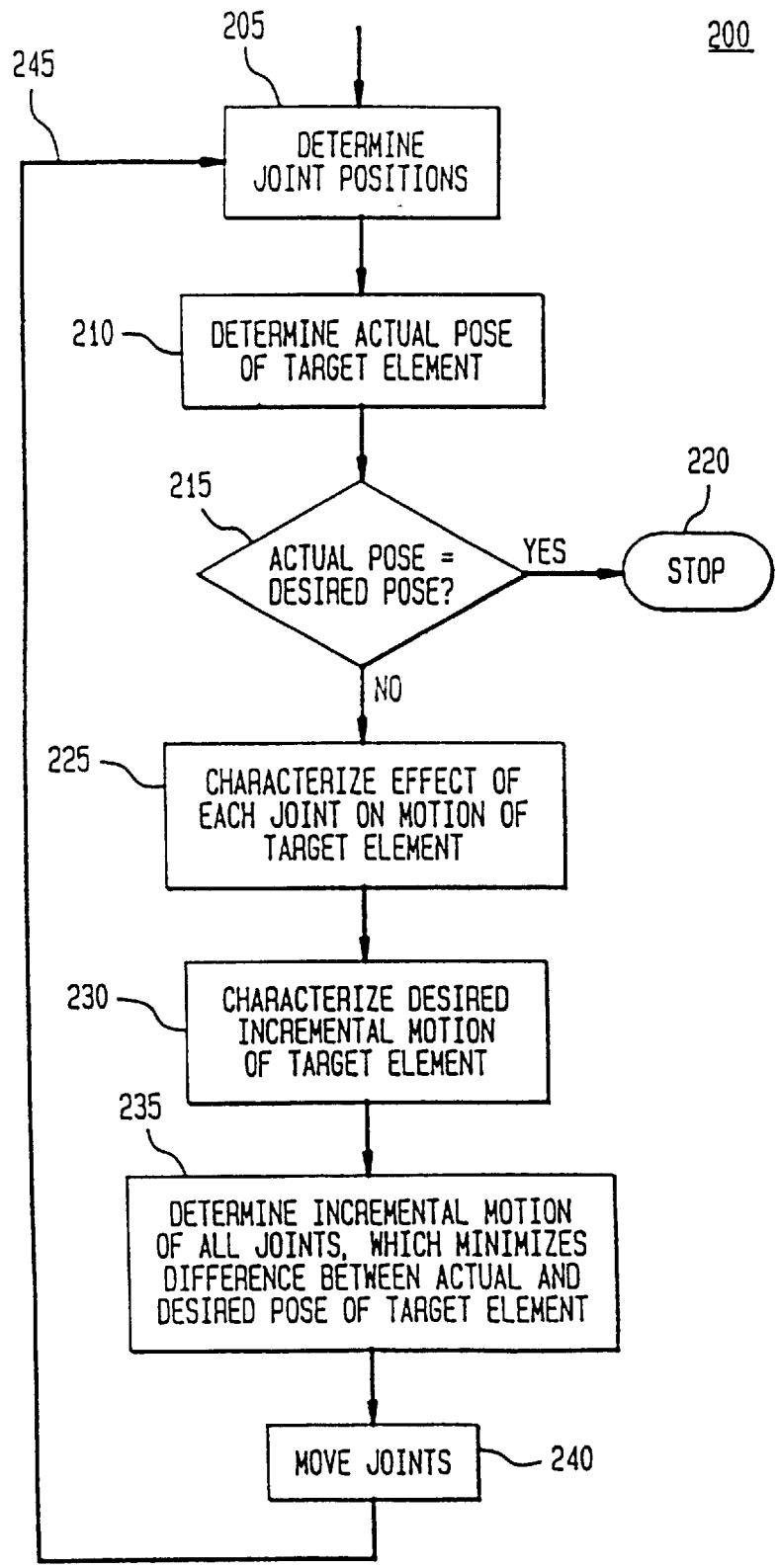
FIG. 2 is a flow chart showing typical prior art steps in controlling an active robotic mechanism.

Referring to FIG. 3, there is shown a block diagram of the novel control method and a hybrid robot mechanism being controlled by the novel control method. The control method 365 executes on a computer 360 and communicates with the hybrid mechanism via control lines 315. The control lines are used to obtain information about the position of each of the mechanism's joints, and to send motion commands to (actuators 111 on) each of the active joints of the hybrid mechanism. Power and other signals are also delivered using the control lines 315. The general structure of a hybrid mechanism consists of an attachment surface (ground 301), where the mechanism is rigidly affixed to the environment, and a serial chain of rigid links (typically 320), connected by joints (typically 312.) We will use the term element to refer to either a link or a joint of the mechanism.

Referring to FIG. 3, the hybrid mechanism shown comprises two sets of one or more passive joints (309, 310), separated by three sets of active joints (305, 306, 307–308). In general, the control method of the present invention can accommodate any number of sets of passive joints, separated by one or more active joints, provided that an environmental constraint acts on one link (element) connected to one of the passive joints in the set.

Also shown in FIG. 3 are two environmental constraints (350, 355) restricting the motion of the mechanism. We will define an environmental constraint to be any restriction on one or more d.o.f. of motion of any element of the mechanism imposed by objects or forces in the environment. An example of an environmental constraint imposed by physical objects in the environment is a small opening in the wall of a hollow object through which all manipulation must be accomplished. In this example the element of the mechanism passing through the opening will not be able to translate laterally relative to the opening. We will say that the element is constrained by the opening. Environmental constraints can also be caused by non-contact interaction between the mechanism and the environment. An example of this type of environmental constraints are force fields, such as electro-magnetic fields, which can constrain the motion of a mechanism's element without the element being in physical contact with the environment. An environmental constraint which is located at a fixed location in the environment will be referred to as a fixed environmental constraint. On the other hand, an environmental constraint which is capable of moving within a bounded volume (range) in the environment will be referred to as a movable constraint. In FIG. 3, the environmental constraint 350 represents a fixed environmental constraint, while the environmental constraint 355 represents a movable environmental constraint. We will further define a constrained element to be an element which is constrained by one or more environmental constraints. We will also refer to the set of one or more passive joints attached to the proximal end of the constrained element as constrained passive joints. (Note again that proximal means closer to the ground 301).

We will refer to the most distal element of a mechanism as an end-element 325. We will further refer to the target element 330 as the element whose position is controlled by the method 365. In FIG. 3, a target element 330 is shown as the most distal element of the mechanism. While the target element being the end-element of a mechanism is common, it need not be the case. The control method can treat any element of the mechanism as the target element.

Also shown in FIG. 3 are an actual pose 335 and a desired pose 340 of the target element 330. The desired pose of the target element is input to the control method as is the actual pose of the target element. The method ends when the difference between the actual pose (335) and the desired pose (340) is less than a desired amount.

Also shown in FIG. 3 is a schematic representation of a task constraint (345). Task constraints (345) and their role in the control of hybrid mechanisms using the present novel method will be discussed below.

Figure 7:
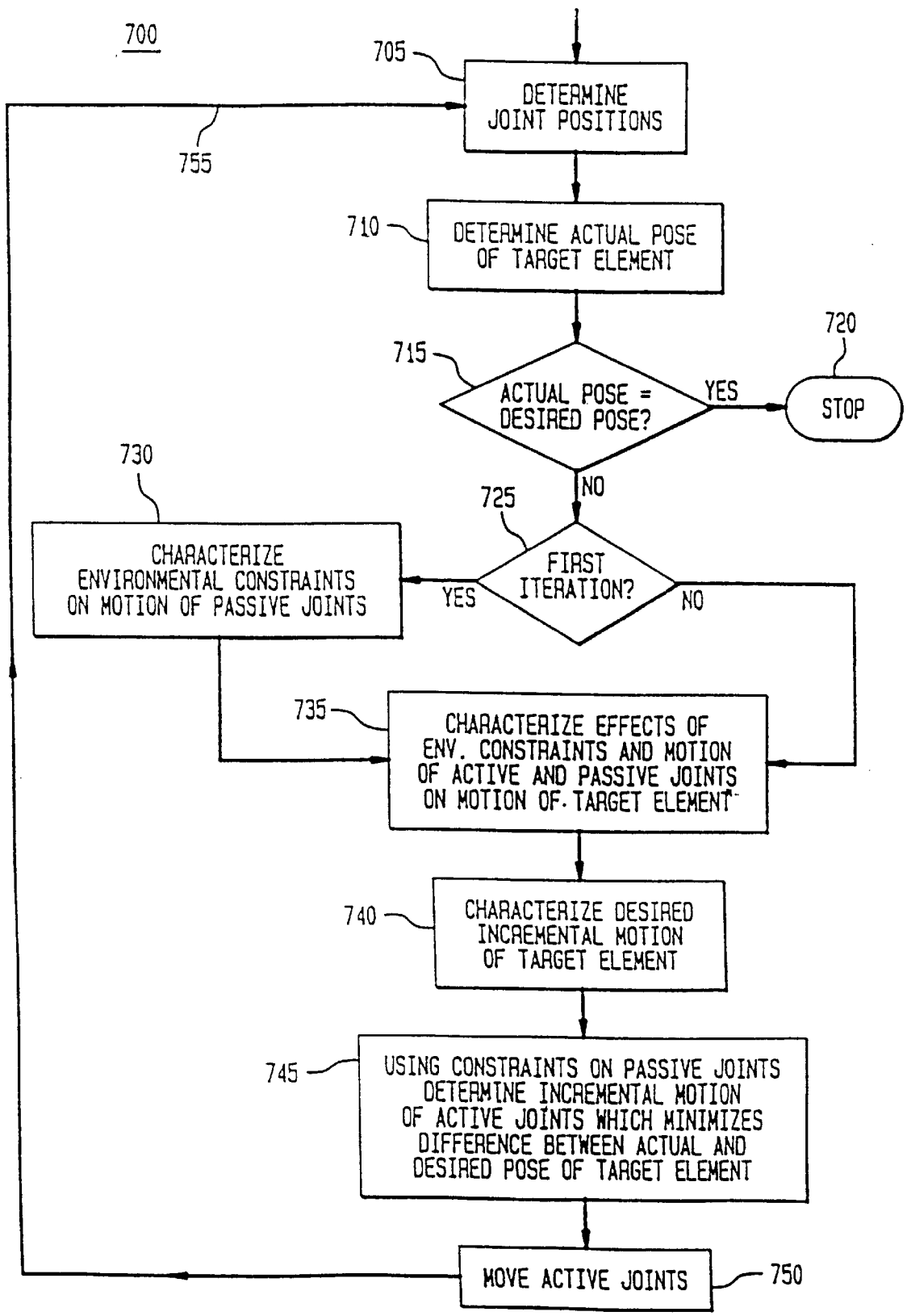
FIG. 7 is a flow chart showing the steps of a preferred method used for controlling robotic mechanisms with active and passive joints.

Referring to FIG. 7, there is shown a flow diagram of an embodiment of the present invention. The method 700 begins by determining the positions of the joints of the mechanism (705). Note that in this invention, both active and passive joint are encoded (typically see passive joint encoders 450 in FIG. 4) so that position of all of the joints of the mechanism can be determined. Using standard mathematical techniques, known in the art as forward kinematics, the method then computes the actual (current) pose of the target element (710). The actual pose of the target element is then compared with the desired pose of the target element (715) and the method terminates (720) if the difference between the actual and desired pose of the target element is less than a predetermined amount, where the amount can be a vector quantity. If the pose difference is larger than the predetermined amount, the method 700 continues to a decision block 725, where the number of the current iteration of the method is checked. If the current iteration is the first iteration of the method, then the method 700 proceeds by characterizing the existing environmental constraints on the motion of the passive joints of the mechanism 730. Otherwise step 730 is bypassed and the method 700 continues at step 735.

Step 730 of the method is a novel component of the novel method and will be explained with the aid of FIG. 4. Referring to FIG. 4, there are shown three examples of environmental constraints which frequently arise in practice.

Figure 4A:
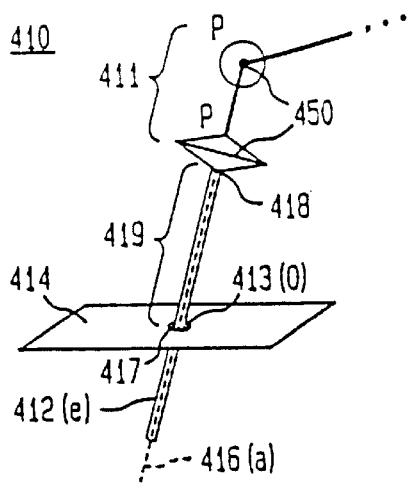
FIGS. 4A–4C, is a diagram showing various types of environmental constraints that can be imposed on a robotic mechanism with active and passive joints while being controlled by the novel method.

FIG. 4A shows a portion of a hybrid mechanism, comprising a set of two passive joints 411 attached to the proximal end 418 of a constrained element 412, which in this example has a circular cross-section. The cylindrical constrained element 412 passes through a circular orifice 413 in a thin plate 414 in the environment. Orifice 413 has a diameter which is slightly larger than the diameter of the constrained element 412, thus constraining the center axis 416 of the constrained element 412 to pass within a predefined tolerance of a fulcrum point 417 at the center of orifice 413. In the idealized case, where the constrained element 412 and orifice 413 both have zero diameters, the long axis 416 of the constrained element 412 will pass exactly through the fulcrum point 417. In a practical example from one preferred embodiment of our method to laparoscopic surgery the constrained element 412 would be a laparoscope or other surgical instrument and the orifice 413 would be a canula inserted into an opening in the patient's abdominal wall. In this case the idealized constraint would approximate the actual constraint. As will be described later, one embodiment of our method explicitly adapts to variations in this approximation. In other embodiments, which may be preferred in application requiring less accurate control, the inaccuracies introduced by the approximation can be ignored.

We will refer to a constraint of the type described above and illustrated in FIG. 4A as a sliding fulcrum constraint. A sliding fulcrum constraint is partially characterized in terms of the location of the fulcrum point 417 with respect to the constrained element 412. This location can be represented by a positive distance 419 from the proximal end 418 of the constrained element 412 to the fulcrum point 417. A sliding fulcrum constraint is further characterized by restricting the motion of the constrained element 412 to three rotational d.o.f. about the fulcrum point 417 and one translational d.o.f. along the constraint element axis 416.

Figure 4B:
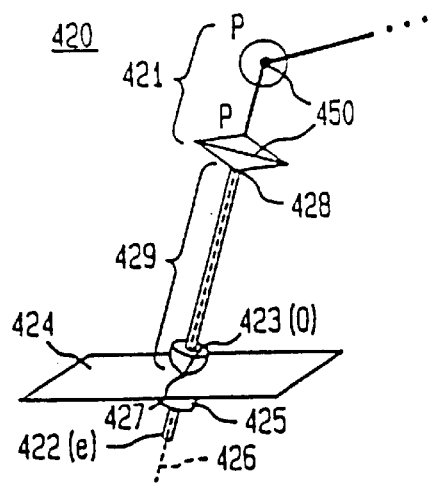

FIG. 4B shows a portion of a hybrid mechanism comprising a set of two passive joints 421 attached to the proximal end of a constrained element 422. The constrained element 422 passes through a circular orifice 423 in a thin plate 424 belonging to the environment. The constrained element 422 consists of an elongated cylindrical member and two semi-spherical members 425. The two semi-spherical members 425 are rigidly attached to the cylindrical member such that their flat faces are perpendicular to the long axis 426 of the constrained element 422 and such that the poles of the two semi-spherical elements face each other and are separated along the direction of the constrained element axis 426 by the thickness of the plate 424. As in the case of FIG. 4A above, the diameter of orifice 423 is only slightly larger than the diameter of the cylindrical member of the constrained element 422, thus constraining the long axis 426 of the constrained element 422 to pass through a fulcrum point 427 at the center of orifice 423. Moreover, due to the shape (including the semi-spherical elements 425) of the constrained element 422, translational motion of the constrained element along its long axis 426 is not possible. Again, this scenario represents an idealized situation but which nevertheless offers a useful approximation to a number of practical situations. We will refer to a constraint of the type described above and illustrated in FIG. 4B as a fulcrum constraint. As in the case of a sliding fulcrum constraint, a fulcrum constraint is partially characterized in terms of the location of the fulcrum point 427 with respect to the constrained element 422. This location can be represented by a positive distance 429 from the proximal end 428 of the constrained element 422 to the fulcrum point 427. A fulcrum constraint is further characterized by restricting the motion of the constrained element 422 to three orthogonal rotations about the fulcrum point 427.

Figure 4C:
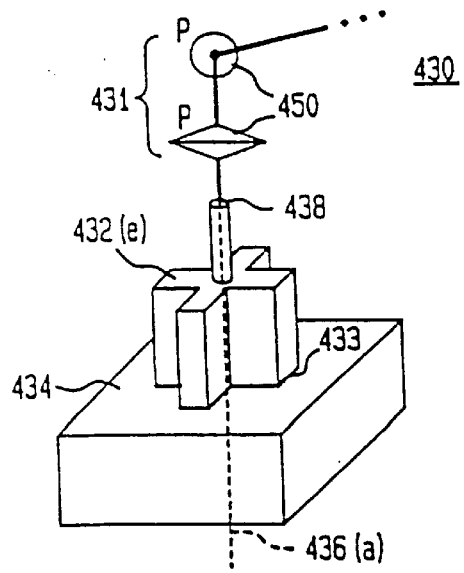

FIG. 4C shows a hybrid mechanism comprising a set of two passive joints 431 attached to the proximal end 438 of a constrained element 432. The constrained element 432 is an elongated polyhedral object, which is symmetric with respect to its primary axis 436 and whose cross-section in the plane perpendicular to the primary axis 436 is a four-sided cross. (This is only an example geometry—many other geometric shapes for the constrained element would apply equally well.) The constrained element 432 passes into an indentation 435 in the environment, which is of the same shape and slightly larger than the constrained element, so that the constrained element 432 fits snugly into the indentation 433. We will refer to this type of constraint as a sliding constraint. A sliding constraint is characterized by constraining the motion of the constrained element 432 to a single translational d.o.f. along the primary axis 436 of the constrained element 432.

Referring to FIGS. 4A, 4B and 4C, in all three cases the restrictions on the motion of a constrained element can be expressed mathematically as a set of inequality constraints on the Cartesian displacement of the constrained element, restricting the motion of the constrained element in the prohibited d.o.f. to be less than a small (possibly infinitesimal) positive amount. These inequality constraints on the Cartesian displacement of the constrained element can then be expressed as equivalent inequality constraints on the motion of the passive joints of the mechanism by making use of the Jacobian mapping, described above and well known in the art. The characterization of the environmental constraints will therefore result in a set of one or more inequality constraints on the motion of the passive joints of the mechanism.

Referring again to FIG. 7, having characterized the environmental constraints on the motion of the constrained elements and the corresponding passive joints in step 730, the method 700 proceeds by characterizing 735 the effects of environmental constraints and the motion of passive and active joints of the mechanism on the motion of the target element. This step is similar to step 225 of method 200 in that it is accomplished by analyzing the effect of moving each individual joint of the mechanism on the Cartesian displacement of the target element and constructing a corresponding Jacobian mapping between infinitesimal joint displacements and the resulting Cartesian displacement of the target element. However, since the hybrid mechanism controlled by method 700 comprises both active and passive joints, step 735 of the novel method 700 represents an extension of the Jacobian mapping to the case where one or more of the joints of the mechanism are passive. This extension is not recognized or suggested in the prior art. Note that by the novel characterization in block (730), we are able to characterize (735) the effects of environmental constraints on both active and passive joints in the same manner.

Next, method 700 proceeds to characterizing the desired incremental motion of the target element (740). This step entails expressing the desired incremental motion of the target element as a vector of desired positional and orientational change.

In step 745 method 700 uses the characterization of environmental constraints on the motion of constrained elements and passive joints of the mechanism (obtained in step 730), together with the Jacobian mapping (obtained in step 735) and the characterized desired incremental motion of the target element (obtained in step 740) to determine an incremental motion for each of the active joints of the mechanism. The determined incremental motion of the active joints of the mechanism (hereafter referred to as the incremental active joint motion) is such that the resulting incremental motion of the target element minimizes the difference between the desired and the actual pose of the target element. Step 745 of method 700 involves setting up a set of nonlinear equations corresponding to the characterized desired motion of the target element as well as a set of one or more linear inequality constraints corresponding to the characterized environmental constraints on the motion of the passive joints of the mechanism, as obtained in step 730 of method 700. The resulting system of equations can be solved by using a numerical constrained nonlinear optimization method. Several such techniques are known in the art. The output of the constrained nonlinear optimization computation are the incremental motions of each of the active joints of the mechanism which optimally minimize the difference between the desired and actual pose of the target element.

Note that the novel characterization of environmental constraints on passive joints (730) in combination with the other steps of the method 700 permit the effects of constraints on passive joints to be described in accounted for in the same manner as constraints on the active joints of the hybrid mechanism.

Finally, step 750 of method moves each of the active joints of the mechanism by the corresponding incremental active joint motion, determined in step 745. The method then returns to step 705 and continues iterating until the pose difference between the desired and actual pose of the target element in step 715 is less than a predetermined amount and the method terminates.

Figure 8:
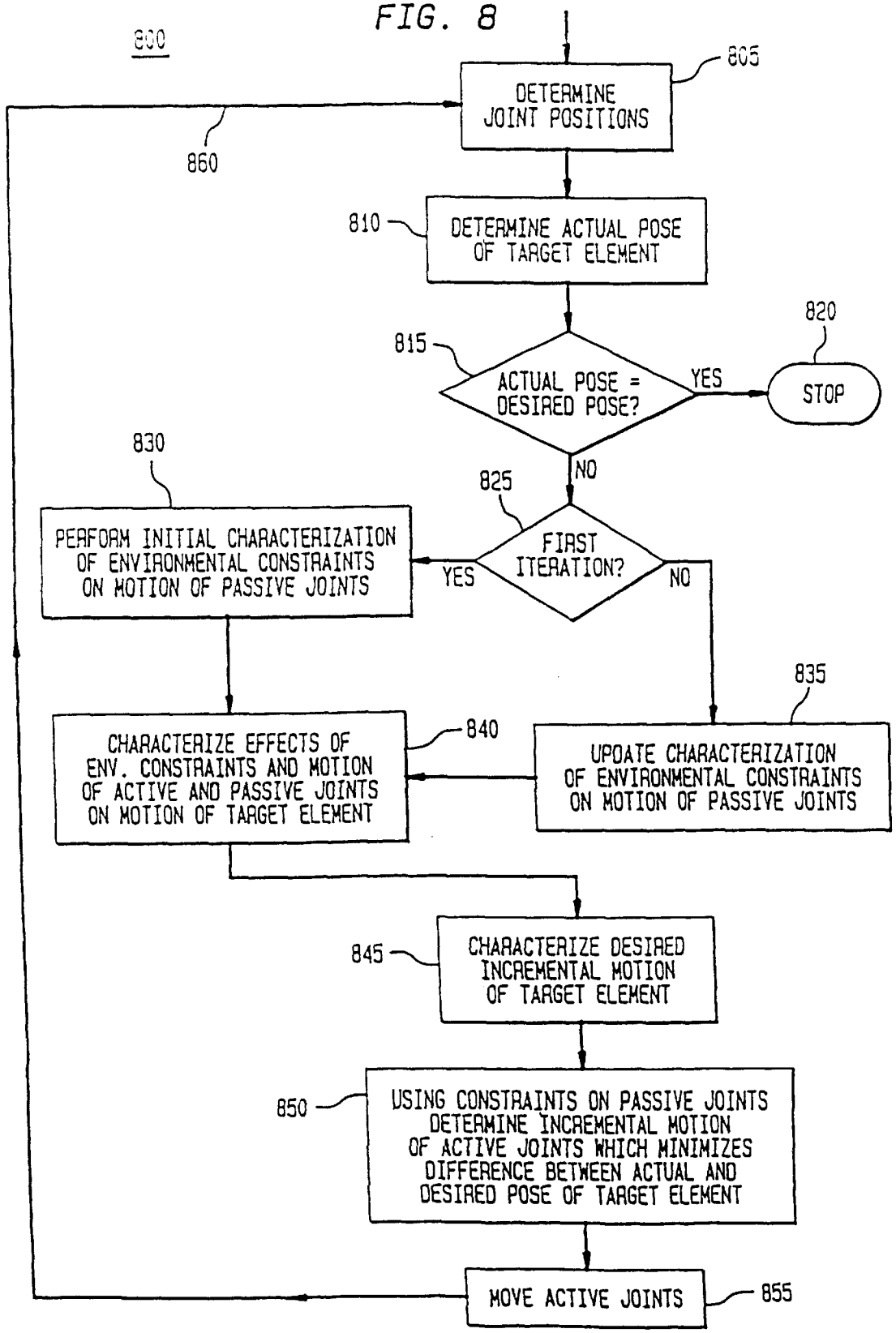
FIG. 8 is a flow chart showing the steps of an alternative preferred method used for controlling robotic mechanisms with active and passive joints.

Referring to FIG. 8, there is shown a flow diagram of an alternative preferred method 800 for control of hybrid mechanisms in the presence of environmental constraints. Steps 805 through 825 of the method 800 are identical to steps 705 through 725 of method 700 of FIG. 7. On the first iteration of the method 800, the method in step 830 performs an initial characterization of environmental constraints on the motion of constrained elements and the attached passive joints. This initial characterization is performed in the same manner as in step 730 of method 700. On subsequent iterations of the method 800, the characterization of the environmental constraints on the motion of constrained elements and the attached passive joints of the mechanism is updated (835), based on the actual incremental motion of the target element. This step is accomplished by comparing the actual and desired incremental motion of the target element and using the difference between the two resulting poses to update the parameters of the characterization of the environmental constraints. Step 835 is a novel component of the method 800 and will be explained with the aid of FIG. 10.

Figure 10:
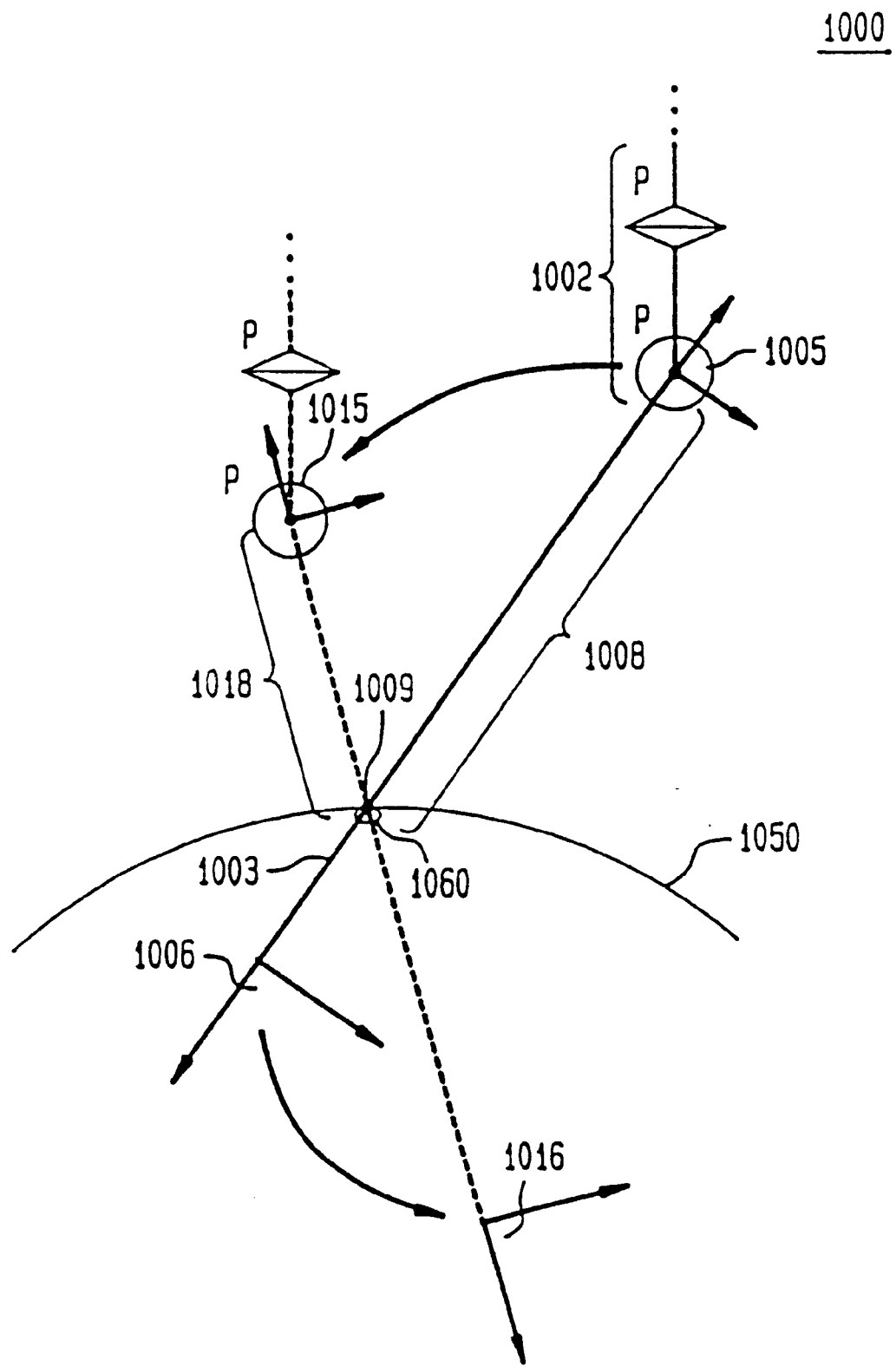
FIG. 10 is a diagram showing an example of updating the characterization of an environmental constraint on the motion of the passive joints of a hybrid mechanism.

Referring to FIG. 10, there is shown an example of updating the characterization of a sliding fulcrum constraint on the constrained element 1003, whose proximal end (of element 1003) is connected to a hybrid mechanism 1001 via a passive universal joint 1002. The sliding fulcrum constraint is created by a small circular opening 1060 in the environment 1050, through which the constrained element 1003 is inserted. (The environment 1050 could be an anatomical structure of a patient.) A coordinate frame 1005 is associated with the proximal end of the constrained element 1003 and a coordinate frame 1006 is associated with the distal end of the constrained element 1003. The sliding fulcrum constraint in FIG. 10 is characterized by the fact that the motion of the constrained element 1003 is restricted to only four d.o.f. of motion—three rotations about the circular opening 1060 in the environment and one translation along the long axis of the constrained element 1003. The sliding fulcrum constraint on the constrained element 1003 is further characterized by the location of the fulcrum point 1009 on the constrained element 1003. (The fulcrum point 1009 can be an incision in the patient.) In FIG. 10 this location is represented by a positive distance 1008 from the origin of the coordinate frame 1005 at the proximal end of the constrained element 1003 to the fulcrum point 1009. Now, consider the situation in which the constrained element 1003 also corresponds to the target element of the hybrid mechanism and the control method 800 is commanded to move the target element from the current (actual) pose 1006 to the new (desired) pose 1016. The method 800 will determine an incremental motion of the active joints of the mechanism so as to place the target element into the configuration shown using dotted lines in FIG. 10. Following the execution of the motion, the proximal end of the constrained element has been moved to pose 1015 and the distal end of the constrained element has been moved to pose 1016, as desired. Note that the location of the fulcrum point 1009 has moved relative to the constrained element 1003; the new distance 1018 from the origin of the coordinate frame 1015 to the fulcrum point 1009 is significantly shorter than it was before the motion. Since this distance comprises part of the characterization of the sliding fulcrum constraint on the motion of the constrained element 1003, the method 800 must update the characterization with the new value of this distance. In the example of FIG. 10 this can be done by intersecting the line passing through the origins of the coordinate frames 1005 and 1006 with the line passing through the origins of the coordinate frames 1015 and 1016. Techniques for determining the intersection of two lines in three dimensional space are well known in the art. The intersection of the two lines gives the updated location of the fulcrum point. The updated value of the distance 1018 can then be computed as the length of the vector connecting the origin of the coordinate frame 1015 and the fulcrum point 1009.

Steps 840 through 860 of the method 800 then proceed as in the case of method 700.

Figure 9:
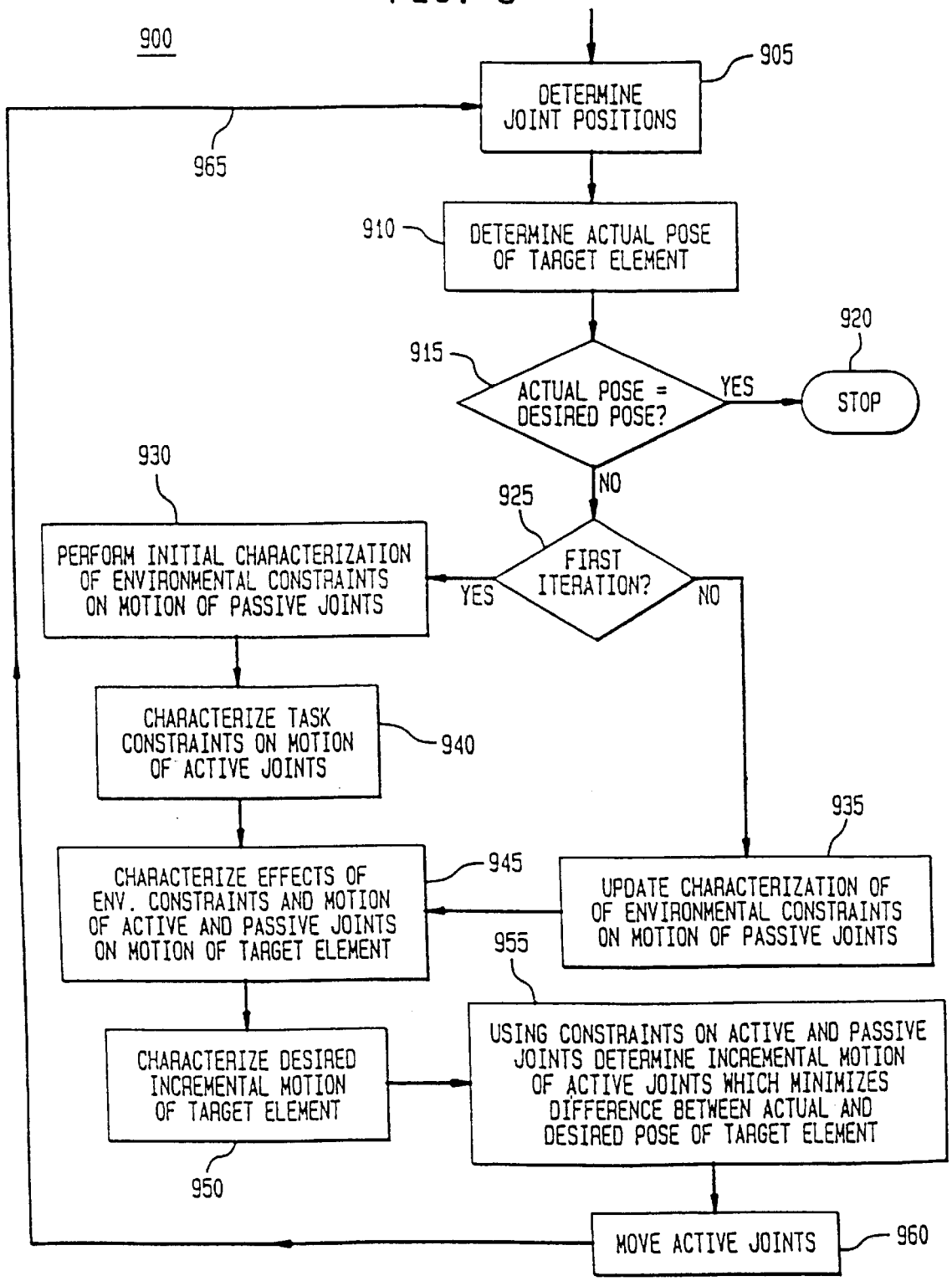
FIG. 9 is a flow chart showing the steps of an alternative preferred embodiment of the present method used for controlling robotic mechanisms with active and passive joints.

Referring to FIG. 9, there is shown a flow diagram of the preferred embodiment of the novel method of controlling a hybrid mechanism in the presence of constraints, dictated by the environment, the geometry of the mechanism or the nature of the task. Steps 905 through 935 of the preferred method 900 are identical to steps 805 through 835 of method 800 of FIG. 8. On the first iteration of the method 900, the method in step 940 performs a characterization of any existing task constraints on the motion of the mechanism. We will define and explain task constraints with the aid of FIG. 5.

Figure 5:
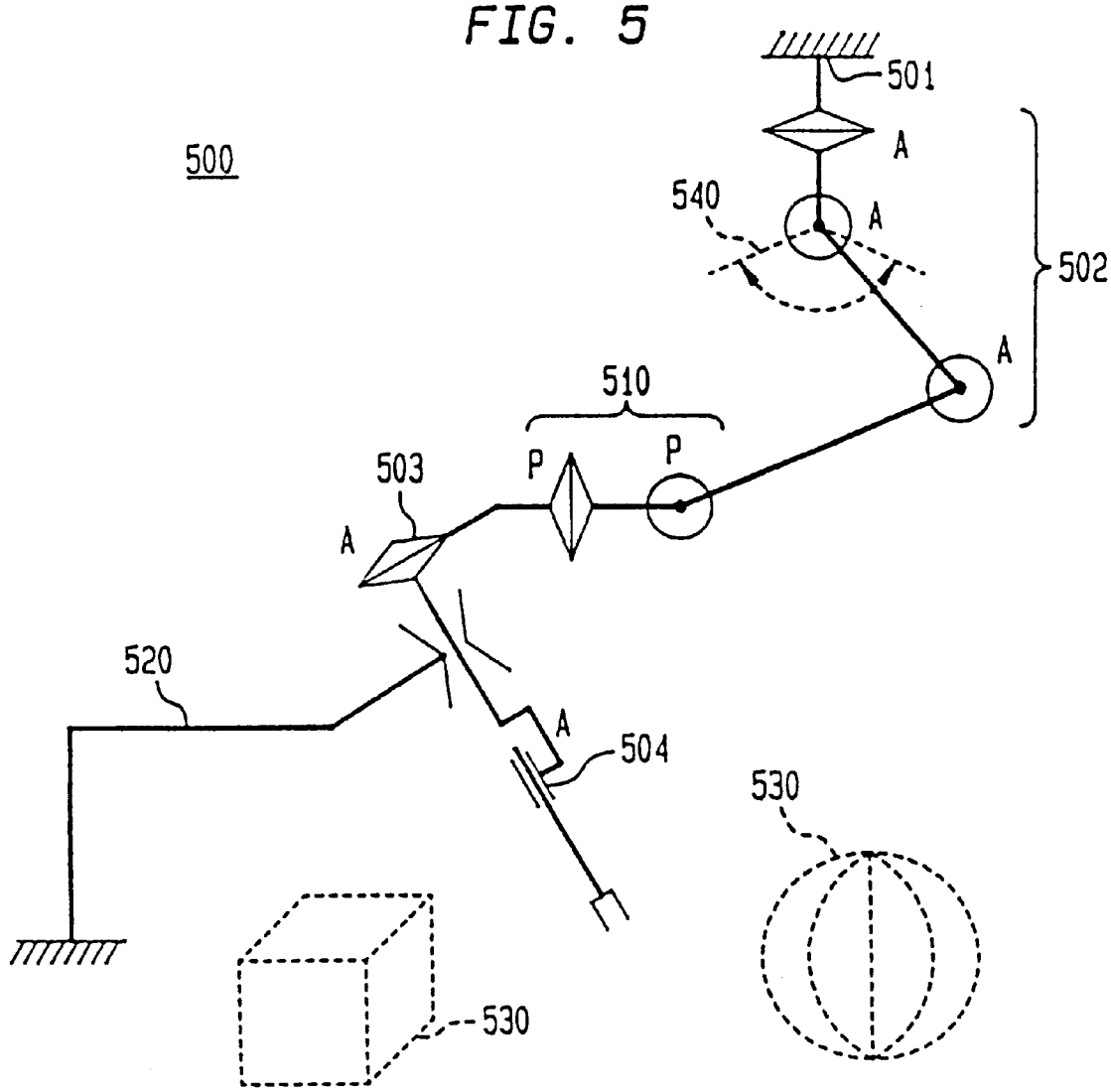
FIG. 5 is a block diagram showing examples of task constraints which can be characterized by the present invention.

Referring to FIG. 5, there is shown a hybrid mechanism, comprising a rigid attachment to the environment 501, two sets of active joints (502, 503–504), and one set of passive joints 510. The mechanism is constrained by a fixed environmental constraint 520 and two task constraints (530, 540). Task constraints are defined as restrictions on the motion of one or more elements of the mechanism due to the particular geometry of the mechanism (e.g., joint range task constraints) or specific requirements of the task (e.g., prohibited volume task constraint). A prohibited volume task constraint requires that no element of the mechanism enter a certain designated volume in the environment. This volume can correspond to an actual physical obstacle in the environment or it can correspond to a virtual object defined for the purposes of the manipulation task at hand. Referring to FIG. 5, task constraint 540 represents a joint range task constraint, and task constraint 530 represents a prohibited volume task constraint. Task constraints impose restrictions on the motion of the mechanism. Because only active joints of the mechanism can be used to move the mechanism, task constraints thus indirectly restrict the motion of the active joints of the mechanism. The exact nature of the restriction imposed on the active joints of the mechanism by a task constraint can be characterized by a set of inequality constraints on the motion of active joints of the mechanism, making use of the Jacobian mapping between infinitesimal joint displacements and the corresponding Cartesian displacements of a mechanism's element. For each existing task constraint on the motion of the mechanism, the method 900 first sets up a set of one or more inequality constraints on the Cartesian motion of one or more elements of the mechanism, so as to ensure that the task constraint will be respected. By making use of the Jacobian mapping, these inequality constraints on the Cartesian motion of the elements are mapped into the corresponding inequality constraints on the motion of the active joints of the mechanism. Referring to FIG. 9, the result of step 940 of method 900 is the union of all inequality constraints on the motion of the active joints of the mechanism, corresponding to all existing task constraints imposed on the motion of the mechanism.

Steps 945 and 950 of the method 900 are identical to the corresponding steps 840 and 845 of method 800 of FIG. 8. In step 955 of the method 900, the method uses the characterized constraints on the motion of active and passive joints as determined in steps 930–940 of the method 900 to determine an incremental motion of the active joints of the mechanism. The incremental active joint motion is determined such that the resulting incremental motion of the target element minimizes the difference between the desired and actual pose of the target element. This step is carried out in a manner similar to that described in step 850 of method 800 in FIG. 8. However, step 955 of the method 900 also uses the set of inequality constraints on the motion of the active joints which has been derived from the characterization of the existing task constraints on the motion of the mechanism in step 940. These inequality constraints are added to the formulation of the nonlinear optimization problem as described in the explanation of step 745 of method 700, and the nonlinear optimization problem is solved as before, using techniques known in the art.

Step 960 of method 900 is identical to step 855 of method 800 in FIG. 8. As before, the method continues until the pose difference in step 915 becomes less than the predetermined amount and the method terminates at step 920.

Figure 6:
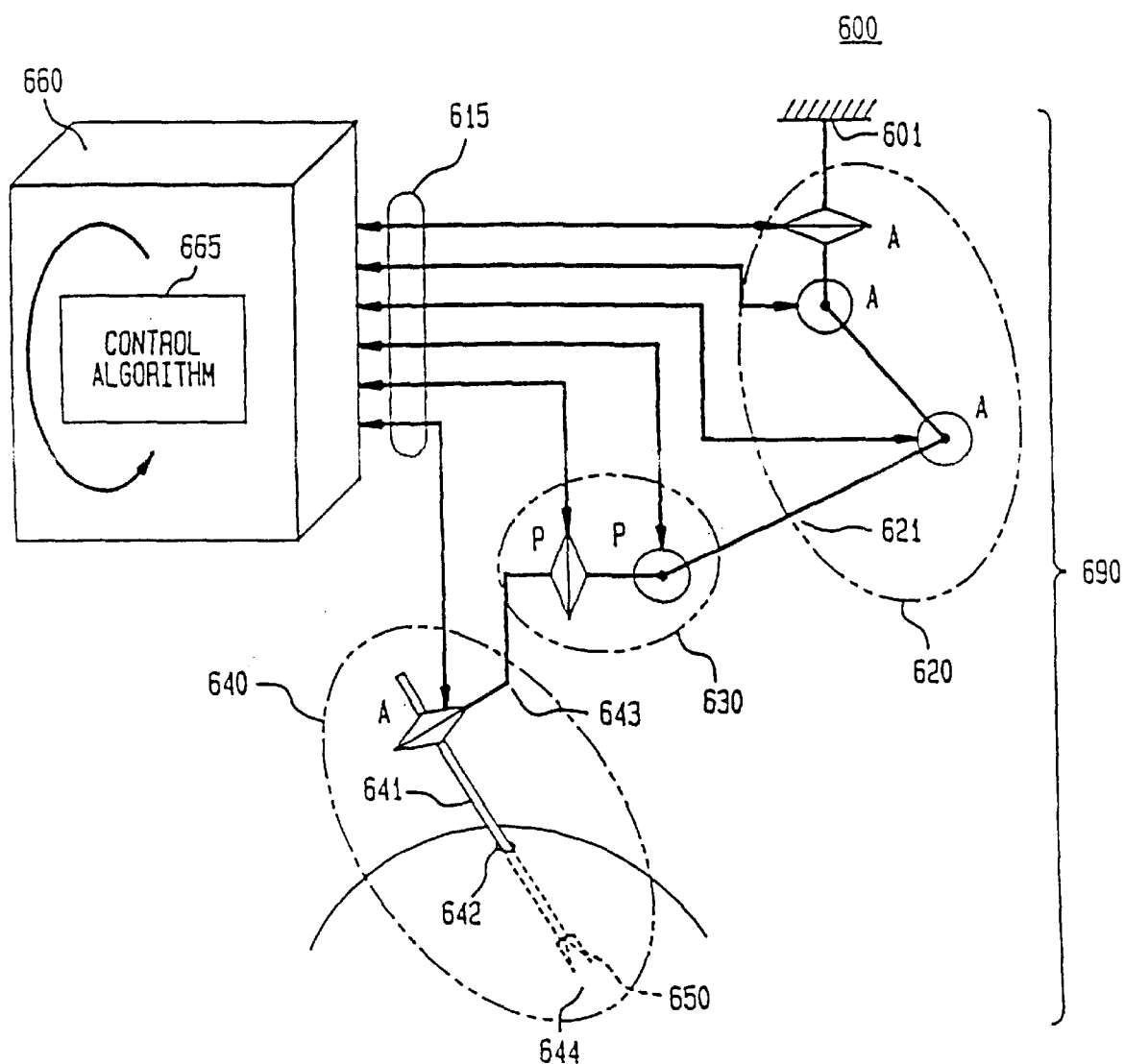
FIG. 6 is a block diagram showing one preferred embodiment of a robotic mechanism with active and passive joints being controlled by the present invention.

Referring to FIG. 6, there is shown a preferred embodiment of the present novel method of controlling a hybrid mechanism and an example of a particular class of hybrid mechanisms, which can be effectively controlled with the preferred method. The preferred method (665) of controlling a hybrid mechanism (690) is method 900 of FIG. 9. The method executes on a computer (660), which is connected to the hybrid mechanism via a set of control lines (615), which carry power and motion commands to the mechanism and bring information about the position of each of the mechanism's joints and status information back to the computer (660). The hybrid mechanism (690) comprises a rigid attachment (601) to the environment, a positioning sub-mechanism (620), connecting passive joints (630), and a constrained sub-mechanism (640). The distal end of the positioning sub-mechanism (positioning sub-mechanism distal end, (621) is connected to proximal end of the constrained sub-mechanism (constrained sub-mechanism proximal end, (643) by the connecting passive joints (630). The positioning sub-mechanism (620) and the constrained sub-mechanism 640 comprise only active joints, whereas the connecting passive joints 630 comprise only passive joints. The constrained sub-mechanism (644) is constrained by a single environmental constraint (642), which restricts the motion of a constrained sub-element (641), belonging to the constrained sub-mechanism (640). The target element (650) is rigidly attached to the distal end of the constrained sub-mechanism (constrained sub-mechanism distal end, 641).

In one preferred embodiment of the present invention the control method 900 is used to control a hybrid mechanism (690), as described above, where the positioning sub-mechanism is capable of positioning the positioning sub-mechanism distal end in three translational d.o.f. While a particular mechanical linkage is shown representing the positioning sub-mechanism in FIG. 6, a variety of different mechanical arrangements will satisfy this requirement. In particular, any robot mechanism having sufficient d.o.f. of motion can serve as the positioning mechanism. Further, in this preferred embodiment, the connecting passive joints 630 connecting the positioning sub-mechanism to the constrained sub-mechanism comprise a two d.o.f. passive universal joint. This type of joint is well known in the art and consists of a serial chain of three links connected by two revolute joints with the rotational axes of the two joints being perpendicular to each other.

In another preferred embodiment of the present invention the constrained sub-mechanism comprises multiple sub-elements connected by active joints, with one of the constrained sub-elements corresponding to the constrained sub-element and another (possibly same) sub-element corresponding to the target element.

In another preferred embodiment of the present invention the constrained sub-mechanism comprises a single sub-element, which corresponds to both the constrained sub-element and the target element.

In another preferred embodiment of the present invention the hybrid mechanism (690) is surgical robot, i.e., a robot capable of performing surgery, and the target element is a surgical instrument.

In another preferred embodiment of the present invention the hybrid mechanism (690) is a surgical robot for assisting in laparoscopic surgery. Further, in this preferred embodiment, the environmental constraint (642) is created by an incision in the abdominal wall of a human patient, through which a surgical instrument is inserted into the patient. In this preferred embodiment, the surgical instrument serves as the constrained sub-element (641) and the incision creates a man-made orifice which imposes a movable sliding fulcrum constraint on the motion of the surgical instrument. The movable nature of the constraint arises from the fact that the patient is breathing and the orifice thus moves with respect to the environment and the surgical robot. Further, in this preferred embodiment a number of task constraints can be specified, corresponding to the boundaries defining prohibited volumes, i.e., volumes which must not be entered by any part of the surgical robot. These volumes will normally correspond to the patient's organs other than those which are being operated on. The complement of the prohibited volume defines the allowable safe motion envelope of the surgical instrument. The surgical instrument is allowed to move anywhere in this volume.

In another preferred embodiment of the present invention the hybrid mechanism (690) is a surgical robot, holding a surgical instrument which is constrained by a natural orifice, such as mouth or ear.

Given this disclosure, other equivalent embodiments would become apparent to one skilled in the art. These embodiments are also within the contemplation of the inventors.

We claim:

1. A method for controlling a robot comprising both active and passive joints constrained by an untouchable opening in an object, comprising steps of:

quantifying constraints of an opening on said active joints and said passive joints;

quantifying current positions of said active joints and said passive joints;

quantifying an actual position of a target element using said current positions of said active joints and said passive joints;

quantifying a desired position for said target element;

calculating a Jacobian using said quantified constraints of the opening relating velocities in active joint space and passive joint space to velocities in Cartesian space for an incremental movement between said actual position and said desired position; and moving said active joints according to said Jacobian such that said opening is untouched.

* * * * *